United States Patent
Kawakami

(10) Patent No.: US 9,561,691 B2
(45) Date of Patent: Feb. 7, 2017

(54) TIRE

(75) Inventor: Yuki Kawakami, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 470 days.

(21) Appl. No.: 14/232,312

(22) PCT Filed: Jul. 13, 2012

(86) PCT No.: PCT/JP2012/067977
§ 371 (c)(1),
(2), (4) Date: Jan. 13, 2014

(87) PCT Pub. No.: WO2013/008926
PCT Pub. Date: Jan. 17, 2013

(65) Prior Publication Data
US 2014/0130951 A1  May 15, 2014

(30) Foreign Application Priority Data

Jul. 13, 2011  (JP) .................................. 2011-155101

(51) Int. Cl.
*B60C 11/13* (2006.01)
*B60C 11/01* (2006.01)

(52) U.S. Cl.
CPC ............ *B60C 11/1307* (2013.04); *B60C 11/01* (2013.01); *B60C 2011/0341* (2013.04); *B60C 2011/0358* (2013.04); *B60C 2011/1338* (2013.04)

(58) Field of Classification Search
CPC .. B60C 11/1307; B60C 11/1338; B60C 11/01; B60C 2011/013
(Continued)

(56) References Cited

U.S. PATENT DOCUMENTS 5,388,625 A * 2/1995 White ................. B60C 11/0309
152/209.21
5,924,464 A * 7/1999 White ................. B60C 11/0306
152/209.17
(Continued)

FOREIGN PATENT DOCUMENTS

EP    2 289 714 A1    3/2011
JP    2001180227 A *    7/2001
(Continued)

OTHER PUBLICATIONS

JPO machine translation of JP 2003-165308, retrieved May 24, 2016.*
(Continued)

*Primary Examiner* — Timothy Kennedy
(74) *Attorney, Agent, or Firm* — Sughrue Mion, PLLC

(57) ABSTRACT

A land block (100) has: a side surface (101) (which constitutes a lateral side surface section) forming a groove wall of a lateral groove (40A); and a side surface (102) (which constitutes a circumferential side surface section) forming a groove wall of a circumferential groove (20A). A protrusion (200) protruding from the side surface (101) in the circumferential direction (tc) of the tire and extending in the radial direction of the tire is formed in the region (101a) of the side surface (101) which is located at a position further toward one side of the side surface (101) in the width direction of the tread than the center of the side surface (101) in the width direction (tw) of the tread.

7 Claims, 12 Drawing Sheets

(58) Field of Classification Search
USPC .......................................... 152/209.21, 209.16
See application file for complete search history.

(56) References Cited

U.S. PATENT DOCUMENTS

| | | | | |
|---|---|---|---|---|
| 2005/0076986 A1* | 4/2005 | Saguchi | .............. | B60C 11/0318 |
| | | | | 152/209.21 |
| 2009/0159166 A1* | 6/2009 | Sakamoto | ............... | B60C 13/02 |
| | | | | 152/209.16 |
| 2010/0200135 A1* | 8/2010 | Ohara | ................. | B60C 11/0316 |
| | | | | 152/209.11 |
| 2011/0277895 A1* | 11/2011 | Takahashi | ........... | B60C 11/0306 |
| | | | | 152/209.18 |

FOREIGN PATENT DOCUMENTS

| | | | |
|---|---|---|---|
| JP | 2002-219909 A | 8/2002 |
| JP | 2003-165308 A | 6/2003 |
| JP | 2003-205706 A | 7/2003 |
| JP | 2007-191093 A | 8/2007 |
| JP | 2008-13037 A | 1/2008 |
| WO | 2009/082394 A1 | 7/2009 |

OTHER PUBLICATIONS

Communication from the European Patent Office issued Feb. 3, 2015 in a counterpart European Application No. 12810571.5.
International Search Report for PCT/JP2012/067977 dated Oct. 9, 2012.

* cited by examiner

TIRE

CROSS REFERENCE TO RELATED APPLICATIONS

This application is a National Stage of International Application No. PCT/JP2012/067977 filed Jul. 13, 2012, claiming priority based on Japanese Patent Application No. 2011-155101 filed Jul. 13, 2011, the contents of all of which are incorporated herein by reference in their entirety.

TECHNICAL FIELD

The present invention relates to a tire having a plurality of lateral grooves, a plurality of circumferential grooves, and a plurality of land blocks which are partitioned by the lateral grooves and the circumferential grooves at a tread portion having a grounding surface which contacts with a road surface.

BACKGROUND ART

A rubber material having a viscous elasticity follows a hysteresis behavior and thus a tread portion of a tire generates a heat by repeating deformation and contraction due to rolling. If the rubber material constituting the tread portion increases, a hysteresis loss due to a bending deformation or a shear deformation at the time of tire rolling increases. Thus, a tire which is large in thickness of the tread portion is likely to increase in temperature.

In particular, a large-scaled tire employed in a large-scaled vehicle used in mine or construction site or the like is characterized in that the tire is not only large in amount of rubber material used, and but also is used in a heavy loading state, on a rough road surface, and under a severe traction condition, and the tire repeats deformation and contraction, and is thus likely to generate a heat. If the tire reaches a high temperature while in cruising, it causes delamination (separation) between the rubber material forming the tread portion and a belt layer or the like, thus leading to acceleration of an exchange cycle of the tire.

Incidentally, there is conventionally known a method of reducing an amount of rubber material that is a heat generation source by forming a subsidiary groove along a tread widthwise direction at a tread portion, and promoting heat radiation of the tread portion by increasing a surface area of the tread portion (for example, Patent Literature 1).

CITATION LIST

Patent Literature

[Patent Literature 1]: Japanese Unexamined Patent Application Publication No. 2003-205706, FIG. 1 or the like

SUMMARY OF INVENTION

However, a conventional tire has entailed a problem as described below. That is, heat radiation can be prompted by forming a lateral groove (an auxiliary groove) crossing in a tire circumferential direction and then increasing a groove area, whereas such an increase in groove area leads to lowering of the rigidity of a tread portion or lowering of the wear and abrasion resistance. The heat radiation property of the tire and the rigidity of the tire are thus in a tread-off relationship, and therefore, there has been a limitation in ensuring the heat radiation property by increasing the groove area.

Accordingly, it is an object of the present invention to provide a tire which is capable of reliably improving a heat radiation property without degrading the rigidity or wear and the abrasion resistance of a tread portion.

To solve the above problem, a feature of the present invention is summarized as a tire comprising: a tread portion having a grounding surface contacting with a road surface; a plurality of lateral grooves which are depressed inside of a tire radial direction from the grounding surface, and which are formed along a tread widthwise direction; a plurality of circumferential grooves which communicate with the plurality of lateral grooves, which is depressed inside of a tire radial direction from the grounding surface, and which is formed along a tire circumferential direction; and a plurality of land blocks which are partitioned by the lateral grooves and the circumferential grooves, wherein the plurality of lateral grooves, the plurality of circumferential grooves, and the plurality of land blocks are formed at the tread portion, the lateral grooves cross the circumferential grooves in a range of the tread widthwise direction in which the lateral grooves are formed, the land block comprising: a lateral side face portion forming a groove wall of the lateral grooves; and a circumferential side face portion forming a groove wall of the circumferential grooves, wherein a protrusion protruding in the tire circumferential direction from the lateral side face portion and extending in a tire radial direction is formed in a region of one side of the tread widthwise direction of the land blocks more significantly than a central part of the lateral side face portion.

In the tire according to the present invention, a part of a relative wind flowing inside of the lateral groove can be induced to the inside of the circumferential groove with respect to the circumferential groove communicating with the lateral groove, and the amount of wind inside of the circumferential groove can be increased. Essentially, in the circumferential groove, the tire rotates, whereby the relative wind of which a direction is opposite to the rotational direction of the tire flows along the circumferential direction of the tire, whereas pneumatic air is formed to flow into the circumferential groove from the lateral groove by means of a protrusion formed on a lateral side face portion, whereby the flow of pneumatic air taking place earlier can be amplified. In this manner, a thermal conductivity is improved, and the temperature of the tread portion can be reduced.

In the above feature of the present invention, a length in the tire radial direction of the protrusion may be smaller than a length from the grounding surface leading up to a bottom portion of the lateral grooves, and an end part in the tire radial direction of the protrusion may be located so as to be inner in the tire radial direction than the grounding surface.

In the above feature of the present invention, the protrusion may be formed in a rectangular shape having the tire radial direction as a longitudinal direction, and a length from an end part of the tread widthwise direction in the block side face portion leading up to an end part of the protrusion in the tread widthwise direction is p, a length in the tire circumferential direction of the protrusion is Lts, and a relationship of p<2·Lts may be met.

In the above feature of the present invention, a length in the tire circumferential direction of the protrusion is Lts, a width in the tire circumferential direction of the lateral grooves is Lls, and a relationship of Lts<0.5Lls may be met.

In the above feature of the present invention, the lateral side face portion may be inclined with respect to a tread widthwise directional line along the tread widthwise direction, and the protrusion may be formed at the lateral side face portion in which an angle formed between the lateral side face portion and the circumferential side face portion is an acute angle.

In the above feature of the present invention, the tire may comprises: a bead portion, a side wall portion communicating with the bead portion, the tread portion contacting with the road surface, and a buttress portion extending from a tread end part located outside of the widthwise direction of the tread portion toward inside of the tire radial direction leading up to a groove bottom of the lateral grooves, wherein a pneumatic air supply mechanism to supply pneumatic air to the lateral grooves may be formed in a range from the tread portion leading up to the buttress portion.

In the above feature of the present invention, the protrusion may be formed only in the land block formed at an inner portion in the tread widthwise direction relative to a cross portion at which the lateral grooves cross the circumferential groove.

According to the present invention, it is possible to provide a tire which is capable of reliably improving a heat radiation property without degrading the rigidity or wear and the abrasion resistance of a tread portion.

BRIEF DESCRIPTION OF DRAWINGS

FIG. 8 (*b*) is a plan view illustrating modification example 3 of the pneumatic tire according to the embodiment.

DESCRIPTION OF EMBODIMENTS

Figure 1:
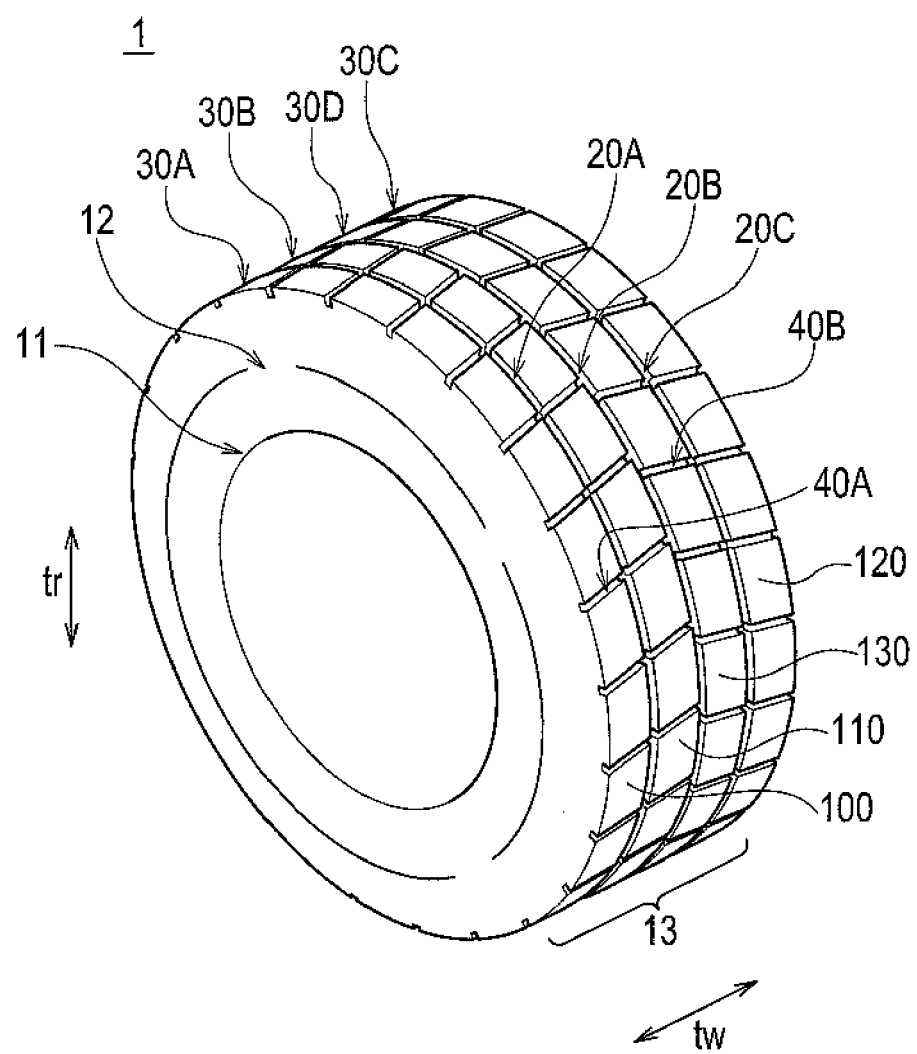
FIG. 1 is a perspective view of a pneumatic tire according to the embodiment.

Embodiments of a pneumatic tire 1 according to the present invention will be described with reference to the drawings. Specifically, a description will be given with respect to (1) Description of structure of pneumatic tire, (2) Description of protrusion, (3) Structure of lateral grooves, (4) Functions and advantageous effects, (5) Modification examples, and (6) Other embodiments.

In the following description of the drawings, same or similar constituent elements are designated by same or similar reference numerals. However, it should be kept in mind that the drawings are merely schematic, and rates or the like of the respective dimensions are different from real ones. Therefore, specific dimensions or the like should be determined in consideration of the following description. In addition, among the respective drawings, portions different from each other in dimensional interrelationship or rate are included.

(1) Description of Structure of Pneumatic Tire

Figure 2:
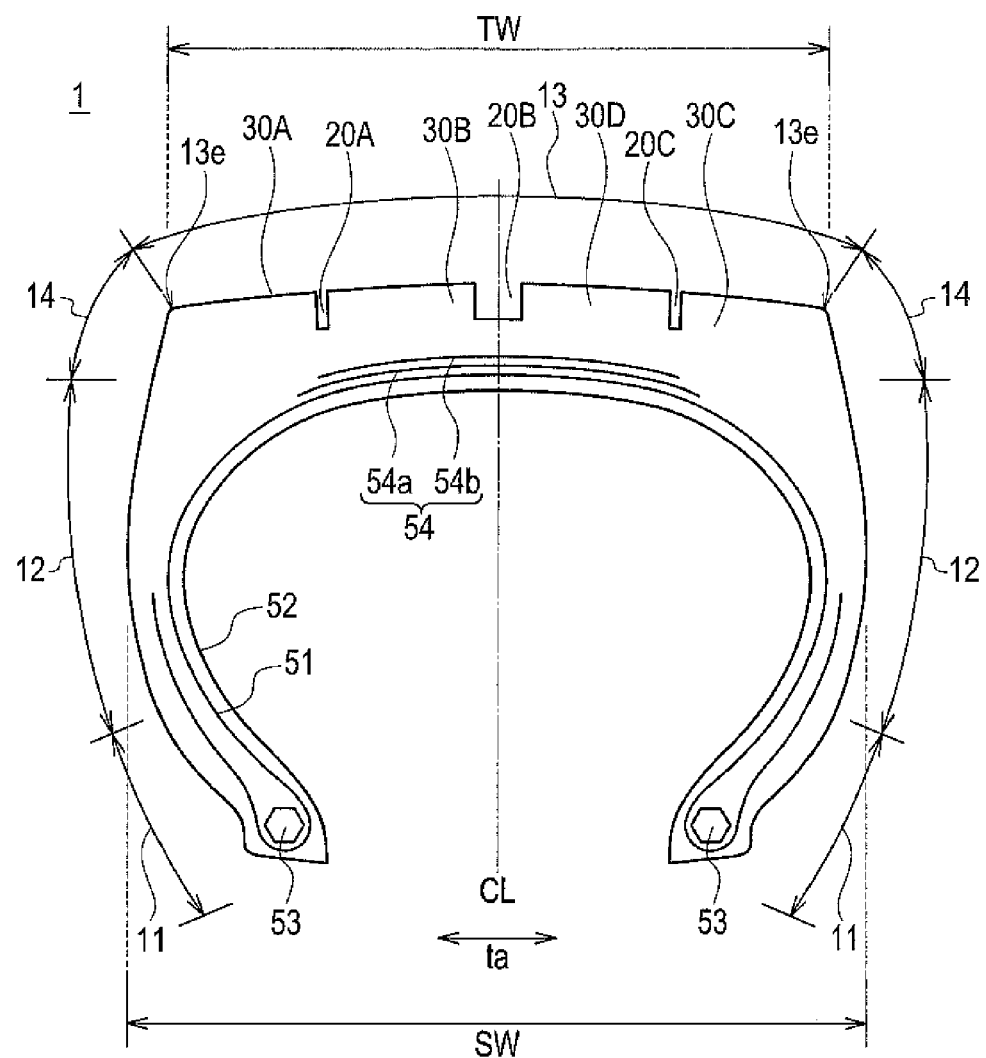
FIG. 2 is a sectional view of a tread widthwise direction and a tire radial direction of the pneumatic tire according to the embodiment.

FIG. 1 is a perspective view of a pneumatic tire 1 according to the embodiment. FIG. 2 is a sectional view taken along a tread widthwise direction tw and a tire radial direction tr of the pneumatic tire 1.

As shown in FIG. 2, the pneumatic tire 1 has: a bead portion 11 contacting with a rim; a side wall portion 12 constituting a side face of the tire; a tread portion 13 grounding on a road surface; a buttress portion 14 located between the side wall portion 12 and the tread portion 13.

The buttress portion 14 is located on an extension of the tire radial direction tr of the side wall portion 12, and is also a portion with which a side face of the tread portion 13 communicates. The buttress portion 14 extends from a tread end part 13*e* outside of the tread widthwise direction of the tread portion 13 toward the inside of the tire radial direction tr. The buttress portion 14 is a portion which is not grounded at the time of normal cruising. The buttress portion is a region extending from a tread end part outside the widthwise direction of the tread portion toward the inside of the tire radial direction leading up to a groove bottom of a lateral groove (lateral grooves 40A, 40B to be described later).

At the tread portion 13, circumferential grooves 20A, 20B, 20C which are depressed from a surface (a grounding surface) of the tread portion 13 toward the inside of the tire radial direction, and are taken along the tire circumferential direction are formed. Also, circumferential land portions 30A, 30B, 30C, 30D partitioned by the circumferential grooves 20A, 20B, 20C are formed.

In addition, at the tread portion 13, a plurality of lateral grooves which are depressed from the surface of the tread portion 13 toward the inside of the tire radial direction and extend in a direction crossing the tire circumferential direction are formed. As shown in FIG. 1, a lateral groove 40A extending in the direction crossing the tire circumferential direction is formed at the circumferential land portions 30A and 30B. A lateral groove 40B extending in a direction crossing a tire circumferential direction is formed at the circumferential land portions 30C and 30D. In the embodiment, the circumferential land portions 30A, 30B, 30C, 30D are separated by the lateral grooves 40A, 40B, whereby land blocks 100, 110, 120, 130 are formed.

Further, the lateral grooves 40A, 40B communicate with the circumferential grooves 20A, 20B, 20C. Furthermore, the lateral grooves 40A, 40B cross the circumferential grooves 20A, 20C in the range of the tread widthwise direction tw in which the lateral grooves 40A, 40B are formed.

Specifically, the lateral groove 40A has a cross portion 300 (refer to FIG. 4) crossing the circumferential groove 20A in the range of the tread widthwise direction tw in which the lateral groove 40A is formed. In other words, the lateral groove 40A is formed so as to cross the circumferential groove 20A. Similarly, the lateral groove 40B has a cross portion (not shown) crossing the circumferential groove 20C in the range of the tread widthwise direction tw in which the lateral groove 40B is formed.

It is to be noted that the lateral grooves 40A, 40B extend from the tread end part 13e to the inside of the tread widthwise direction tw, and communicate with the circumferential groove 20B extending along a tire equator line CL.

The pneumatic tire 1 has a carcass layer 51 which serves as a skeleton of the pneumatic tire 1. Inside of the tire radial direction of the carcass layer 51, an inner liner 52 which is a rubber layer with high air tightness equivalent to a tube is provided. Both ends of the carcass layer 51 are supported by a pair of beads 53.

Outside of the tire radial direction of the carcass layer 51, a belt layer 54 is disposed. The belt layer 54 has a first belt layer 54a and a second belt layer 54b which are obtained by rubber-drawing a steel cord. A steel cord constituting the first belt layer 54a and the second belt layer 54b is disposed while having a predetermine angle with respect to the tire equator line CL. The tread portion 13 is disposed outside of the tire radial direction of the belt layer 54 (the first belt layer 54a and the second belt layer 54b).

The circumferential land portions 30A, 30B, 30C, 30D of the pneumatic tire 1, that is, the land blocks 100, 110, 120, 130 have side faces along a tire circumferential direction tc of the circumferential land portions 30A, 30B, 30C. Also, the land blocks 100, 110, 120, 130 have side walls along the tread widthwise direction tw. As one example, a side face 101 along the tread widthwise direction tw of the land block 100 has a protrusion 200 protruding in the tire circumferential direction tc from the side face 101. It is to be noted that the protrusion 200 protruding in the tire circumferential direction tc may have a side face along the tread widthwise direction tw of the land blocks 110, 120, 130.

A maximum width of the pneumatic tire 1 is referred to as SW, and a width of the tread portion 13 of the pneumatic tire 1 is referred to as TW. The pneumatic tire 1 may be filled with inert gas such as oxygen gas instead of pneumatic air. In the embodiment, the pneumatic tire 1 is a radial tire of 80% or less in flatness, 57" or more in rim diameter, 60 mton or more in loading capacity, and 1.7 or more in load factor (k-factor).

(2) Description of Protrusion

Figure 3:
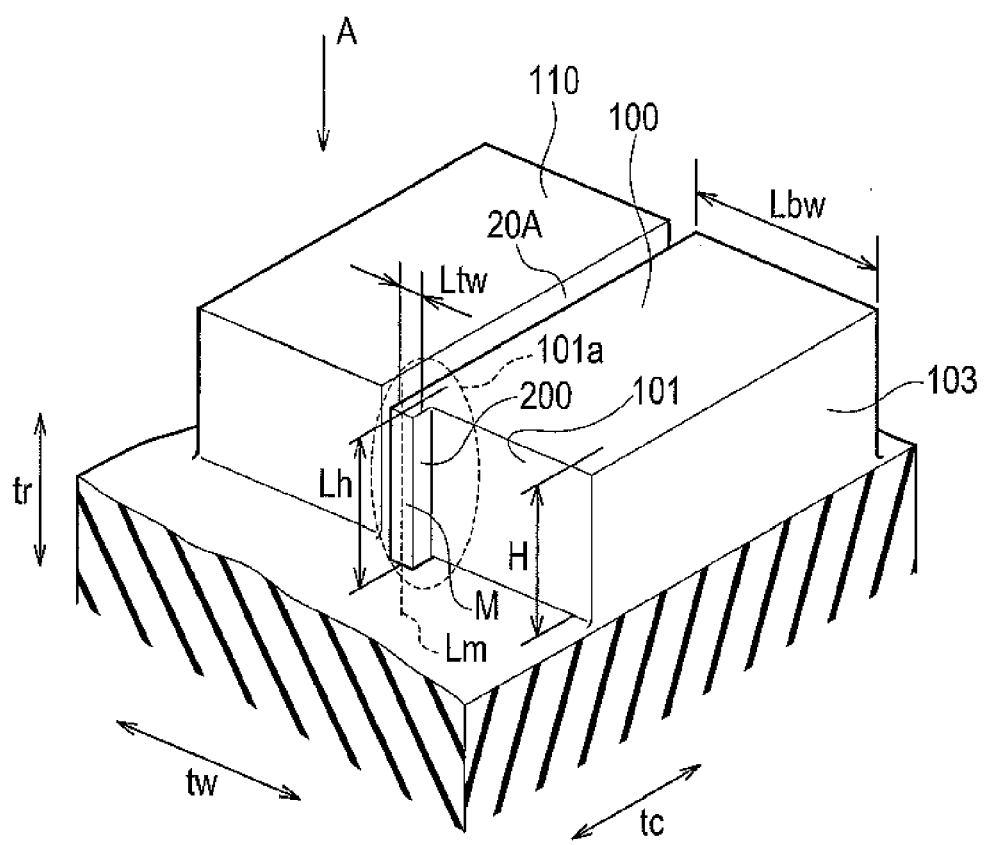
FIG. 3 is an enlarged perspective view enlarging a part of a tread portion of the pneumatic tire according to the embodiment.
Figure 4:
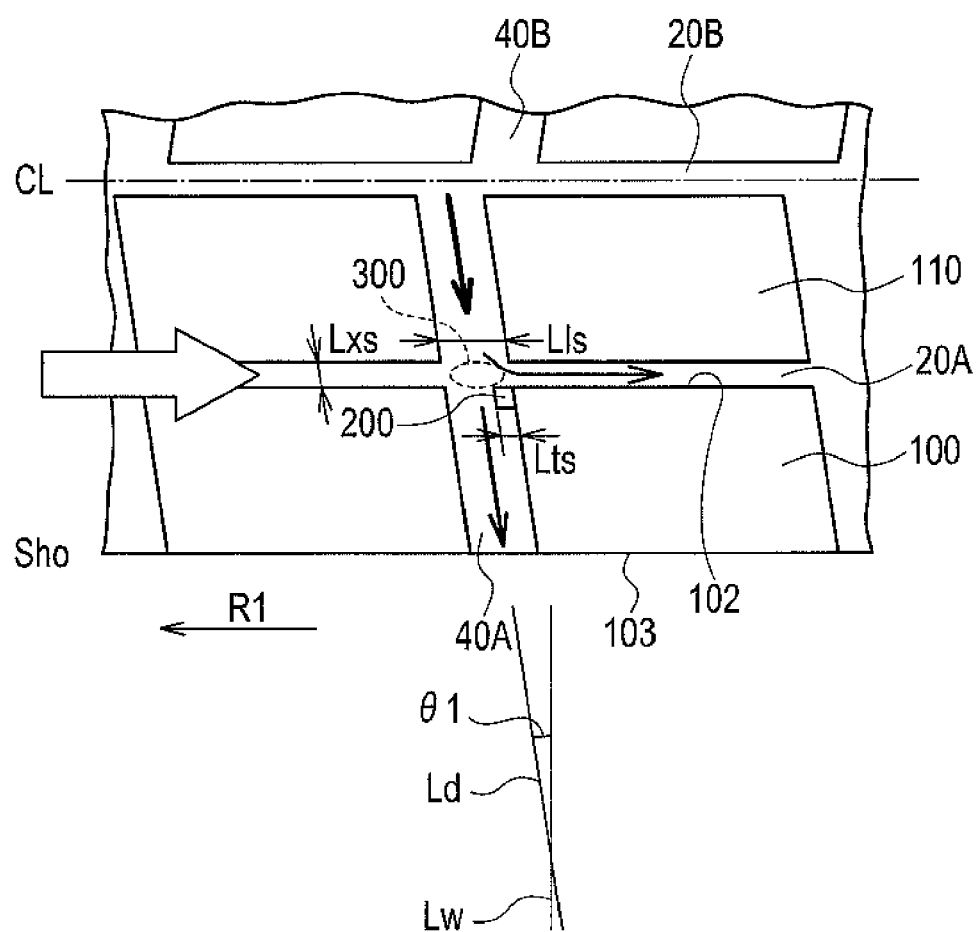
FIG. 4 is a plan view when it is seen in the direction indicated by the arrow A of FIG. 3.

FIG. 3 is an enlarged perspective view enlarging a part of the tread portion 13 of the pneumatic tire 1. FIG. 4 is a plan view when it is seen in the direction indicated by the arrow A of FIG. 3.

The land block 100 has: a side face 101 forming a groove wall of the lateral groove 40A (constituting a lateral side face portion); a side face 102 forming a groove wall of the circumferential groove 20A (constituting a circumferential side face portion); and a side face 103 opposite to the side face 102. The side face 101 is inclined with respect to the tread widthwise directional line Lw along the tread widthwise direction tw.

A protrusion 200 protruding in the tire circumferential direction tc from the side face 101 and extending in the tire radial direction tr is formed in a region 101a on one side of the tread widthwise direction more significantly than a central part of the tread widthwise direction tw in the side face 101 (inside of the tire widthwise direction tw in FIG. 3).

In the embodiment, the protrusion 200 is formed in a rectangular shape having long edges in the tire radial direction tr. In the embodiment, a longitudinal direction of the protrusion 200 is coincident with a tire normal Lm, and is disposed so that the tread widthwise direction tw and the transverse direction formed in a rectangular shape are coincident with each other.

A length of the tread widthwise direction tw of the land block 100 is referred to as Lbw; a length of the tire radial direction tr of the protrusion 200 is referred to as Lh; a length in the tread widthwise direction tw of the protrusion 200 is referred to as Ltw; and a length along the tire circumferential direction tc from the side face 101 of the protrusion 200 is referred to as Lts. Also, a groove width of the lateral groove 40 is referred to as Lls. In the embodiment, a relationship of Ltw<0.5Lbw and Lts<0.5Lls is met.

Figure 5:
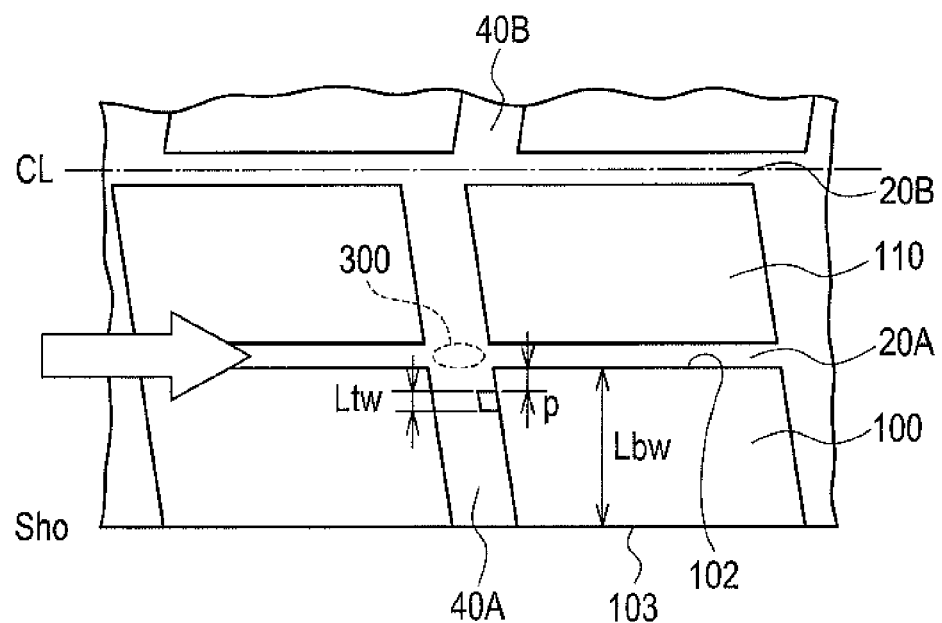
FIG. 5 is a plan view illustrating a position of a protrusion of the pneumatic tire according to the embodiment.

FIG. 5 shows another embodiment in which a position of the protrusion 200 in the side face 101 is changed. As shown in FIG. 5, when a length from an end part of the tread widthwise direction tw of the land block 100 leading up to an end part of the tread widthwise direction tw of the protrusion 200 is p, the protrusion 200 may be formed at a position meeting a relationship of p<2·Lts.

(3) Structure of Lateral Groove

A lateral groove 40A extends in a direction in which it is inclined with respect to a tread widthwise direction tw. Also, it is preferable that an angle θ1 between an extension direction ld of the lateral groove 40A and the tread widthwise direction Lw be in the range of 15 degrees or more and 60 degrees or less. It is to be noted that the extension direction Ld of the lateral groove 40A and the extension direction of a side face 101 in a land block 100 are parallel to each other.

Reasons why an angle θ1 is in the range mentioned above are given below. This is because, if the angle θ1 is smaller than 15 degrees, the amount of wind flowing inside of the lateral groove 40A is reduced by rotation of the pneumatic tire 1. On the other hand, if the angle θ1 is greater than 60 degrees, the amount of wind flowing inside of the lateral groove 40A increases, whereas a width in the tire circumferential direction tc of the land block 100 decreases. This is because there is an apprehension that the rigidity of the land block 100 lowers, causing lowering of a tire performance such as a steering property or a wear and abrasion resistance.

Also, the lateral groove 40A has a cross portion 300 crossing the circumferential groove 20A in the range of the tread widthwise direction tw in which the lateral groove 40A is formed. In the pneumatic tire 1 according to the embodiment, the protrusion 200 is formed in the land block 100 formed so as to be outer in the tread widthwise direction tw than the cross portion 300 at which the lateral groove 40A cross the circumferential groove 20A.

(4) Function and Advantageous Effects

FIG. 4 shows the flow of pneumatic air taking place when the pneumatic tire 1 rotates in a rotational direction R1 (the outline arrow). In the pneumatic tire 1, the protrusion 200 protruding in the tire circumferential direction tc from the side face 101 and extending in the tire radial direction is formed in the region 101a of the tread widthwise direction tw in the side face 101. Thus, with the rotation of the pneumatic tire 1, the flow of pneumatic air along the lateral groove 40A can be induced to the circumferential groove 20A communicating with the lateral groove 40A, and the amount of wind inside of the circumferential groove 20A can be increased.

Essentially, in the circumferential groove 20A, with the rotation of the pneumatic tire 1, a relative wind of which a direction is opposite to the rotational direction flows, whereas pneumatic air is formed to flow inside of the circumferential groove 20A from the lateral groove 40A, whereby the flow of pneumatic air taking place in advance can be amplified. In this manner, a thermal conductivity is improved, and the temperature of the tread portion can be reduced.

In the embodiment, the length Ltw in the tread widthwise direction tw of the protrusion 200 is smaller than the length Lbw in the tread widthwise direction tw of the land block 100, and a relationship of Ltw<0.5Lbw is met. Also, the length Lts along the tire circumferential direction tc from the side face 101 of the protrusion 200 is smaller than the groove width Lls of the lateral groove 40, and a relationship of Lts<0.5Lls is met.

It is preferable that the length Lts along the tire circumferential direction tc from the side face 101 of the protrusion 200 be the size that does not preclude the flow of pneumatic air inside of the lateral groove 40. By establishing the condition of Lts<0.5Lls, the flow of pneumatic air inside of the lateral groove 40 can be ensured.

In the embodiment, a layout can be provided so that the longitudinal direction formed in the rectangular shape of the protrusion 200 and the tire radial direction (that is, the tire normal) are coincident with each other, and the tread widthwise direction and the transverse direction formed in the rectangular shape are coincident with each other. By providing such a layout, a part of the flow of pneumatic air inside of the lateral groove 40A can be formed to efficiently flow into the circumferential groove 20A.

It is to be noted that in the pneumatic tire 1 according to the embodiment, a groove width of the circumferential grooves 20A to 20C may be smaller than a groove width of the lateral grooves 40A to 40B. Specifically, as shown in FIG. 4, a groove width Lxs in the tread widthwise direction tw of the circumferential groove 20A may be smaller than a groove width Lls in the tire circumferential direction tc of the lateral groove 40A. Namely, the groove width Lxs and the groove width Lls may meet a relationship of Lxs<Lls.

As the pneumatic tire 1 of such a structure, there is presupposed a tire widening the groove width Lls of the lateral groove 40A in order to ensure traction performance in a worse road surface such as mine, for example. Further, in a large-scaled tire for mine, since a drainage property is not prone to become a problem in particular, circumferential grooves are often set to be finer in comparison with a vehicle tire or the like. In the tire for mine for which such a design is made, the amount of tread rubber increases, and there is a desire for further improvement in durability against deterioration exerted by heat generation. In such a pneumatic tire 1, in the circumferential groove 20A, with the rotation of the pneumatic tire 1, a relative wind of which a direction is opposite to the rotational direction flows, whereas the groove width Lxs is small and thus it is presupposed that the amount of the wind is not sufficient.

In the pneumatic tire 1 according to the embodiment, since the protrusion 200 protruding in the tire circumferential direction tc from the side face 101 is formed, pneumatic air is formed to actively flow into the circumferential groove 20A from the lateral groove 40A, whereby the flow of pneumatic air into the circumferential groove 20A can be amplified. In this manner, even in the case where the groove width Lxs of the circumferential groove 20A is smaller than the groove width Lls of the lateral groove 40A, a thermal conductivity inside of the circumferential groove 20A is improved, and the temperature of the tread portion 13 can be reduced. That is, even in the case where the groove width Lxs of the circumferential groove 20A is small, the temperature of the tread portion 13 can be reduced merely by employing a slight rubber member constituting the protrusion 200.

Also, the pneumatic tire 1 according to the embodiment is capable of reducing the temperature of the tread portion 13 by forming the protrusion 200 without increasing groove areas of the circumferential groove 20A, 20B, 20C of the lateral grooves 40A, 40B. That is, according to the pneumatic tire 1 according to the embodiment, it is possible to improve the heat radiation property without degrading the rigidity or wear and abrasion resistance of the tread portion 13.

(5) Modification Examples (5-1) Modification Example 1

Figure 6:
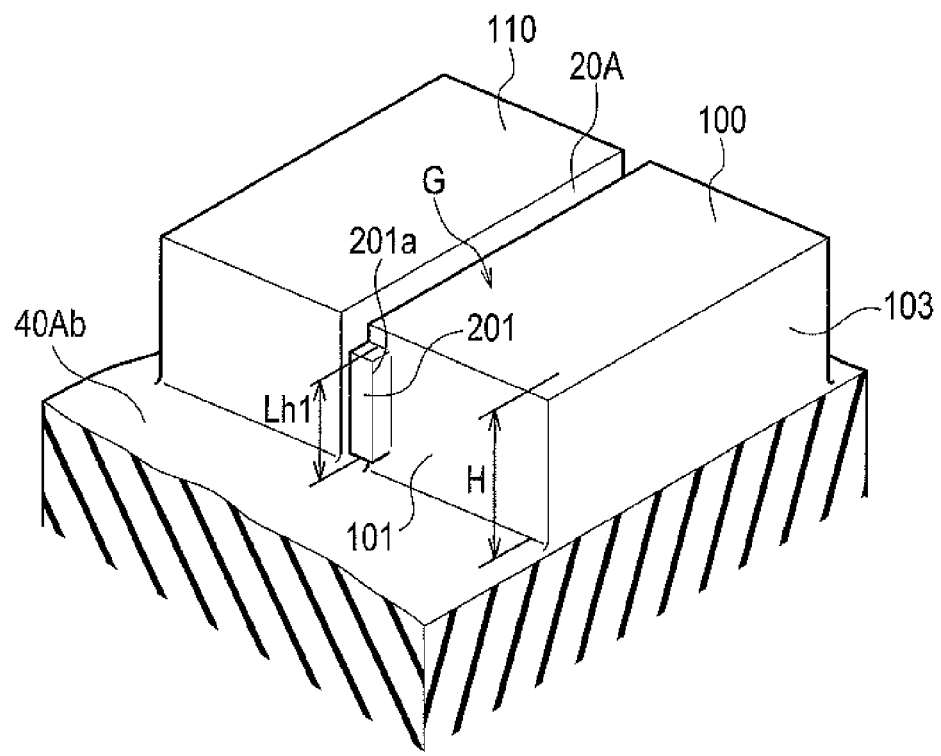
FIG. 6 is a perspective view illustrating modification example 1 of the protrusion of the pneumatic tire according to the embodiment.

FIG. 6 is a perspective view illustrating a modification example of a protrusion formed in a side face 101 of the pneumatic tire 1 according to the embodiment. A length Lh1 in a tire radial direction tr of a protrusion 201 shown in FIG. 6 is smaller than a length H (that is, a groove depth H) from a grounding surface G leading up to a groove bottom portion 40Ab of a lateral groove 40A, and an end part 201a in the tire radial direction tr of the protrusion 201 is configured so as to be located to be inner the tire radial direction than the grounding surface G at an initial state of use.

For example, in the embodiment, Lh1 and the groove depth H meet a relationship of $0.1 \leq Lh/H \leq 0.7$ (Lh=Lh1).

In the case where the length Lh1 of the protrusion 201 is equivalent to the depth H of the lateral groove 40A, when a land block 100 is deformed so as to be compressed in a tire radial direction by grounding of the pneumatic tire 1, a buckling deformation for the protrusion 201 to bend with respect to the tire radial direction tr takes place. Owing to cruising on rough road or the like, the buckling deformation of the protrusion 201 is repeated, and the protrusion 201 is easily damaged.

On the other hand, in the protrusion 201 of modification example 1, the length Lh1 in the tire radial direction tr is formed so as to be smaller than the groove depth H of the lateral groove 40A and thus the bucking deformation of the protrusion 201 hardly takes place, and the protrusion 201 is hardly damaged. Therefore, a role of causing the flow of pneumatic air inside of the lateral groove 40A to flow into the circumferential groove 20A can be sustained. That is, an advantageous effect of improving a thermal conductivity and then reducing the temperature of the land block 100 can be sustained.

In the embodiment, in the case where the length Lh1 of the protrusion 201 does not meet 10% of the depth H of the lateral groove 40A, an advantageous effect of guiding the flow of pneumatic air in the lateral groove 40A into the circumferential groove 20A is reduced, making it difficult to improve thermal conductivity. Also, if the length Lh in the tire radial direction of the protrusion 201 exceeds 70% of the depth H of the lateral groove 40A, the buckling deformation of the protrusion 201 is likely to take place and thus such a situation is not preferable.

(5-2) Modification Example 2

Figure 7:
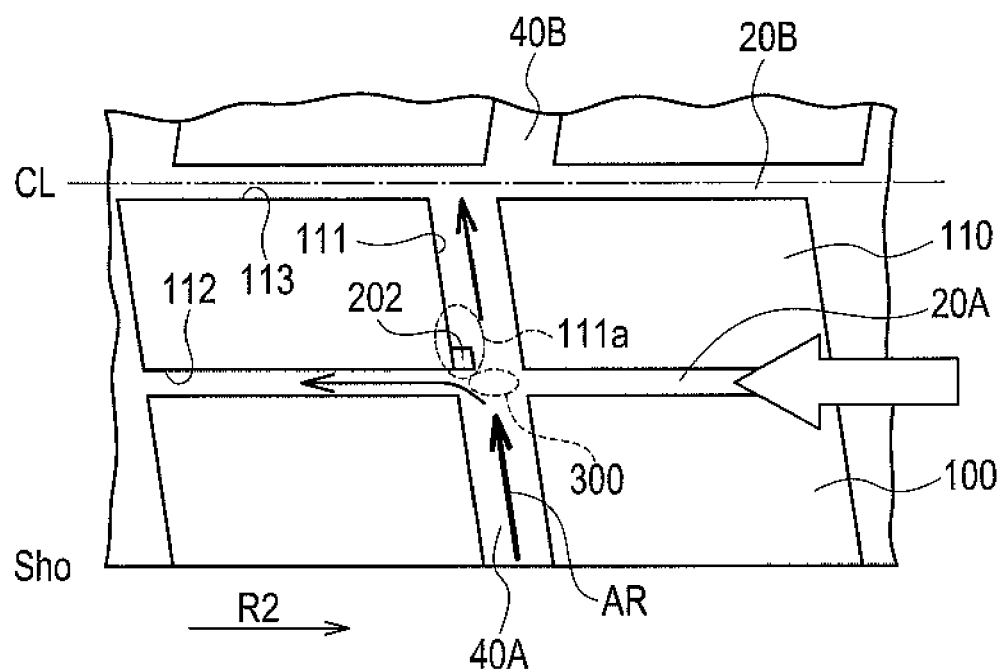
FIG. 7 is a plan view illustrating modification example 2 of the protrusion of the pneumatic tire according to the embodiment.

FIG. 7 is a plan view illustrating modification example 2 of a protrusion of the pneumatic tire according to the embodiment. As shown in FIG. 7, in the pneumatic tire according to the embodiment, a protrusion 202 may be formed only in a land block 110 formed so as to be inner a tread widthwise direction tw than a cross portion 300 at which a lateral groove 40A crosses a circumferential groove 20A. Namely, in the case where the circumferential groove 20A crossing the lateral groove 40A is defined as a reference, the protrusion 202 may be formed only in the land block 110 adjacent to the inside of the tread widthwise direction tw of the circumferential groove 20A.

In other words, the protrusion may be formed on a lateral side face portion such that an angle formed between a lateral side face portion and a circumferential side face portion of the land block 100 is obtained as an acute angle. Specifically, in the embodiment, the protrusion 202, as shown in FIG. 7, formed in a region 111*a* of one side in the tread widthwise direction more significantly than a central part of the tread widthwise direction tw in a side face 111 constituting a lateral side face portion of the land block 110 adjacent to the land block 110 (outside of the tire widthwise direction in FIG. 7). The protrusion 202 protrudes in the tire circumferential direction tc from the side face 111, and is formed so as to extend in the tire radial direction.

FIG. 7 shows the flow of pneumatic air taking place when the pneumatic tire 1 rotates in a rotational direction R2 (the outline arrow). In the pneumatic tire 1, with the rotation of the pneumatic tire 1, the flow of pneumatic air along the lateral groove 40A can be induced to the circumferential groove 20A communicating with the lateral groove 40A, and the amount of wind inside of the circumferential groove 20A can be increased. In this manner, a thermal conductivity is improved, and the temperature of the tread portion can be reduced.

In particular, as shown in FIG. 7, in the pneumatic tire 1 according to the embodiment, an extension direction of the lateral groove 40A (40B) has a directional pattern inclined to the tire rotational direction R2 side. In the pneumatic tire 1, the amount of wind inside of the lateral groove 40A (40B) increases, and the amount of wind inside of the circumferential groove 20A can be increased more significantly by means of the protrusion 202 formed only in the land block 110 formed inside of the tread widthwise direction tw more than the cross portion 300. That is, even if a slight rubber member constituting the protrusion 202 is merely employed, the temperature of the tread portion 13 can be efficiently reduced by considering a position forming the protrusion 202.

(5-3) Modification Example 3

Figure 8:
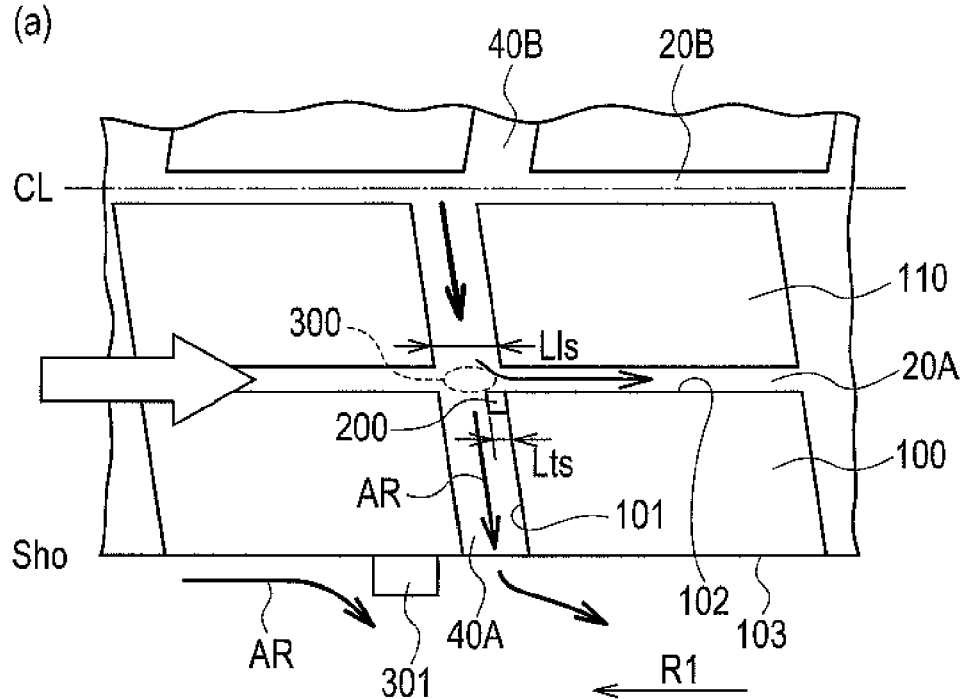
FIG. 8 (*a*) is a plan view illustrating modification example 3 of the pneumatic tire according to the embodiment.
Figure 8:
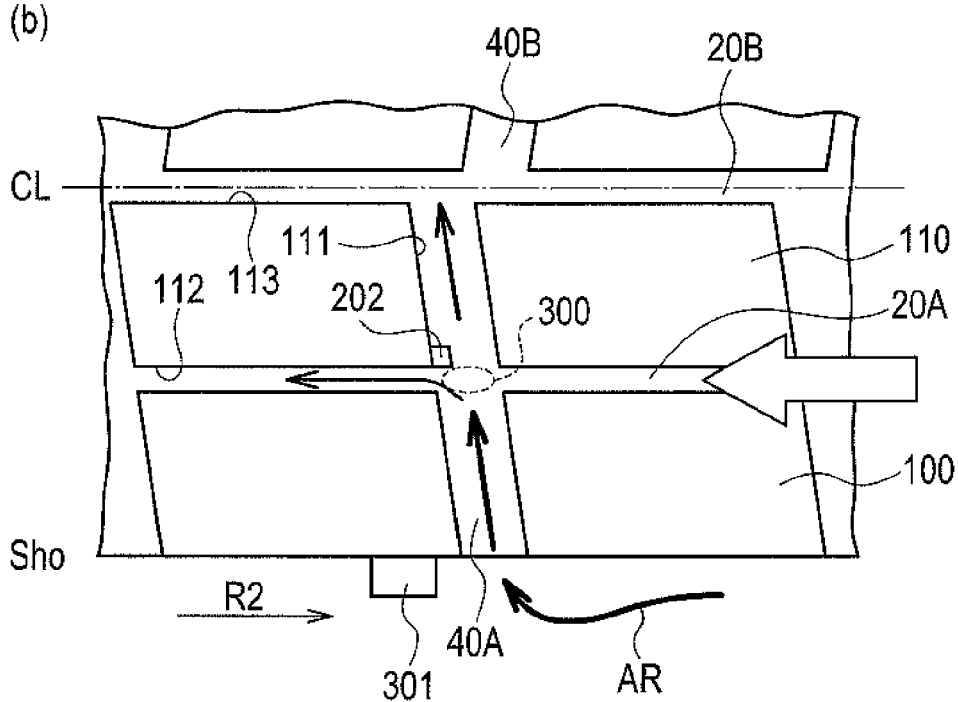

FIG. 8 is a plan view illustrating modification example 3 of the pneumatic tire 1. In the pneumatic tire 1, an air supply mechanism to supply pneumatic air to the lateral groove 40A may be formed in the range from the tread portion 13 leading up to the buttress portion 14. It is to be noted that the air supply mechanism may be formed at least at a part in the range from the tread portion 13 leading up to the buttress portion 14. For example, the air supply mechanism to supply pneumatic air to the lateral groove 40A may be formed at least at a part in the range from a shoulder block leading up to the buttress portion 14. Specifically, as shown in FIG. 8, a buttress protrusion 301 protruding in the tread widthwise direction tw may be formed at the buttress portion 14 of the pneumatic tire 1. It is to be noted that in the embodiment, the range from the tread portion 13 leading up to the buttress portion 14 denotes the range between the grounding surface G and the side face 103 in the land block 100 located to be the outermost in the tread widthwise direction tw of the tread portion 13.

In the case where the buttress protrusion 301 is formed at the buttress portion 14, an effective position to form the protrusion 200 is different depending on an inclination angle with respect to a tread widthwise directional line along the tread widthwise direction tw of the lateral groove 40A and a position at which the buttress protrusion 301 is formed in the land block 100.

FIG. 8 (*a*) is a plan view when it is seen from a grounding surface side, and is also a schematic view illustrating the flow of pneumatic air taking place when the pneumatic tire 1 with the buttress protrusion 301 being formed at the buttress portion 14 rotates in the rotational direction R1; and FIG. 8 (*b*) is a schematic view illustrating the flow taking place when its rotates in the rotational direction R2.

As shown in FIG. 8 (*a*), in the case where the pneumatic tire 1 rotates in the rotational direction R1, the flow (relative wind) AR of pneumatic air due to the rotation hits against a side face of the buttress protrusion 301 formed at the buttress portion 14 and then flows while rolling over the buttress protrusion 301. At this time, the flow of pneumatic air going to the outside of the widthwise direction takes place outside of the rotational direction of the side face of the buttress protrusion 301. Owing to this flow, pneumatic air is forced to come out through the lateral groove 40A or the circumferential groove 20A, and the flow AR of pneumatic air going to the outside from the lateral groove 40A takes place.

Therefore, if the protrusion 200 is formed at a position such that an angle formed between the side face 101 and the side face 102 in the land block 100 is obtained as an acute angle, the pneumatic air flowing inside of the lateral groove 40A increases, and can be formed to efficiently flow into the circumferential groove 20A. In this manner, the thermal conductivity inside of the lateral groove 40A is improved, and the temperature of the land block 100 can be reduced. Further, the temperature of the tread portion 13 can be reduced.

Also, as shown in FIG. 8 (*b*), in the case where the pneumatic tire 1 rotates in the rotational direction R2, the flow (relative wind) AR of pneumatic air due to the rotation hits against the side face of the buttress protrusion 301 which is formed at the buttress portion 14, and is taken in the lateral groove 40A. Thus, the flow AR of pneumatic air around the pneumatic tire 1 is taken in the lateral groove 40A, and a flow rate of the pneumatic air flowing inside of the lateral groove 40A can be increased.

Therefore, if the protrusion 202 is formed at a position such that an angle formed between a side face 111 and a side face 112 in the land block 110 is obtained as an acute angle, the pneumatic air flowing inside of the lateral groove 40A is increased, and can be forced to efficiently flow into the circumferential groove 20A. In this manner, the thermal conductivity inside of the lateral groove 40A is improved, and the temperature of the land block 100 can be reduced. Further, the temperature of the tread portion 13 can be reduced.

Figure 9:
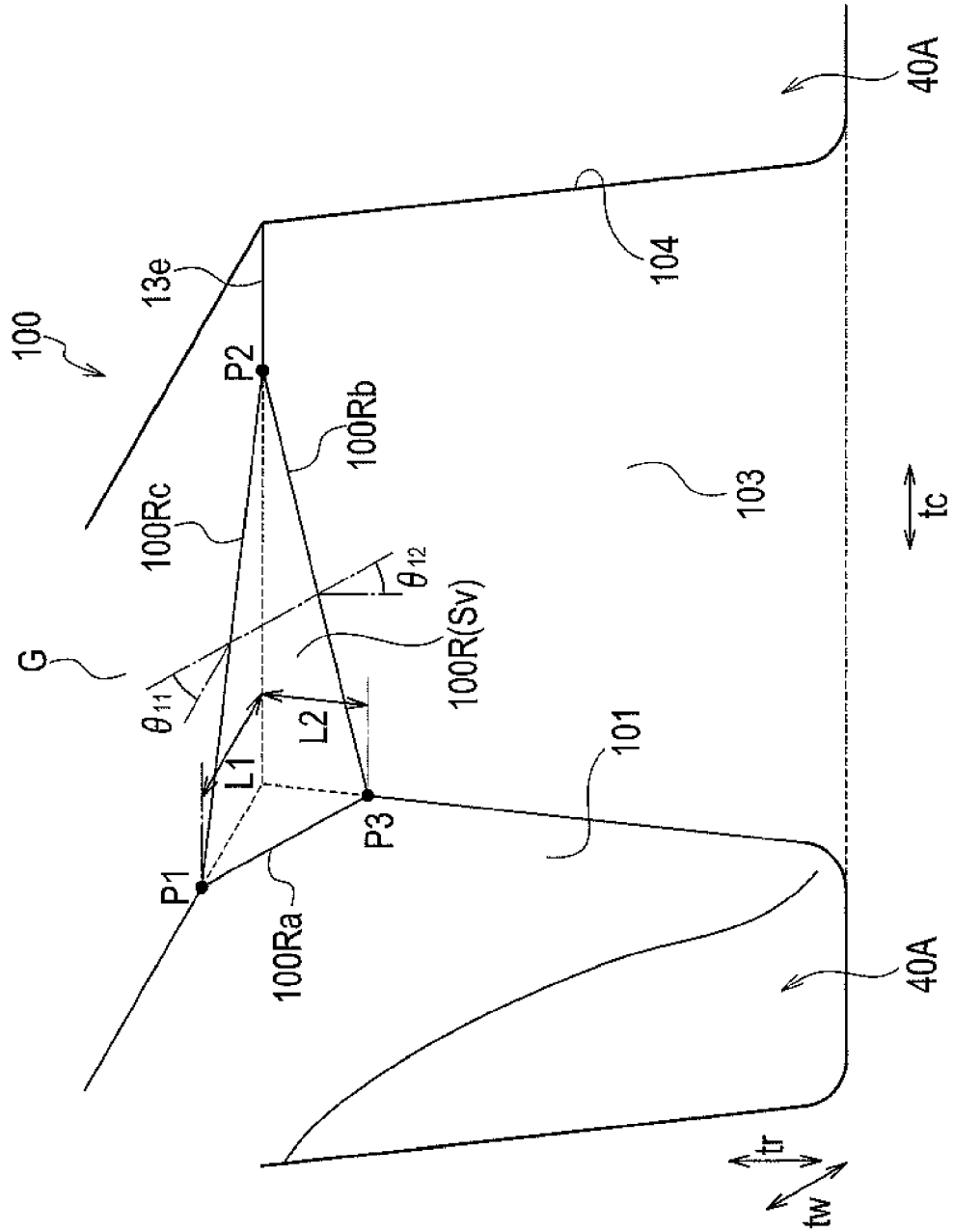
FIG. 9 is a plan view illustrating modification example 3 of the pneumatic tire according to the embodiment.
Figure 10:
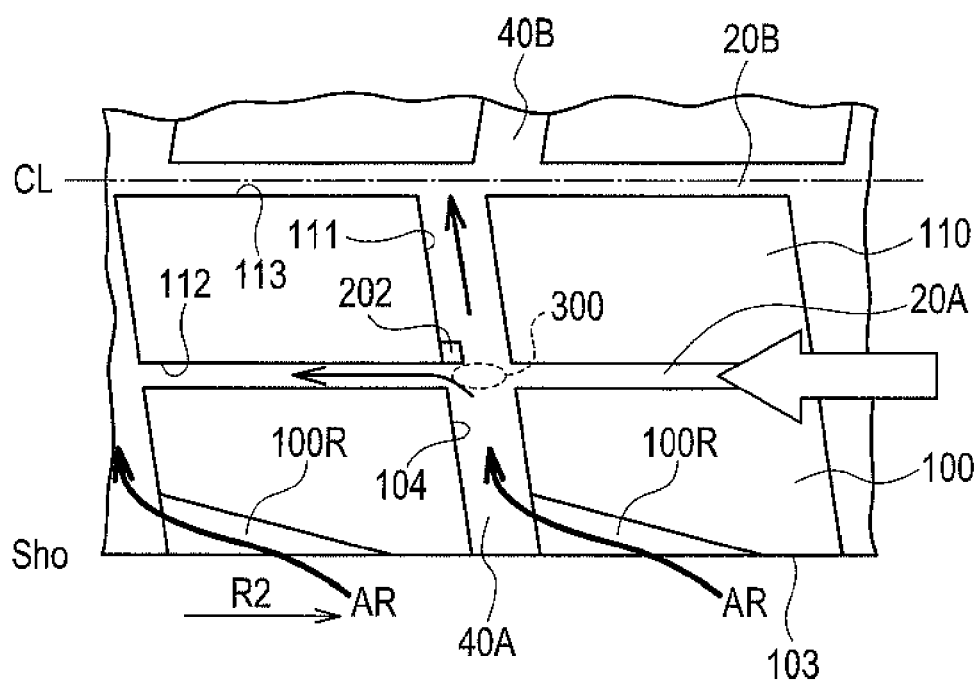
FIG. 10 is a plan view illustrating modification example 3 of the pneumatic tire according to the embodiment.

While in the foregoing embodiment, the air supply mechanism has been described by exemplifying a case in which the buttress protrusion 301 to be formed at the buttress portion 14 is formed, the air supply mechanism is not limitative thereto. For example, as shown in FIG. 9 and FIG. 10, as an air supply mechanism, a tapered face 100R may be formed in the land block 100.

The land block 100 has a tapered face 100R crossing the grounding surface G, the side face 101, and the side face 103 in the tread end part 13*e* which is formed by the grounding surface G, the side face 101, and the side face 103.

The tapered face 100R extends toward the tire circumferential direction tc at the tread end part 13*e* formed by the grounding surface G and the side face 103. The tapered face 100R is inclined toward the inside of the tire radial direction tr as it goes to one side of the tire circumferential direction tc in the cross sections of the tire circumferential direction tc and the tire radial direction tr of the land block 100. The tapered face 100R is inclined toward the inside of the tire radial direction tr, as it goes to the outside of the tread widthwise direction tw also in the cross sections of the tread widthwise direction tw and the tire radial direction tr of the land block 100.

That is, the tapered face 100R is formed so as to chamfer an apex at which the grounding surface G, the side face 101, and the side face 103 cross each other. In other words, the tapered face 100R is formed so as to have at least one edge on a respective one of the faces between the grounding surface G and the side face 101 and the side face 103.

It is to be noted that the tapered face 100R has one edge on the side face 101, and does not have one edge on the side face 104 of the side face 101 and the side face 104 in the tire circumferential direction tc of the land block 100.

As described above, by forming the tapered face 100R, the pneumatic air flowing along the tapered face 100R at the time of rotation of the pneumatic tire 1 is likely to collide with the lateral groove face 104 of another land block 100 adjacent to the tire circumferential direction tc. That is, the pneumatic air flowing along the tapered face 100R is easily taken in a lug groove 40A adjacent to the tire circumferential direction tc of the land block 100.

In the embodiment, the shape of the tapered face 100R is a planar shape. That is, the shape of the tapered face 100R linearly extends in the cross sections of the tire circumferential direction tc and the tire radial direction tr or in the cross section of the tread widthwise direction tw and the tire radial direction tr.

Also, in the case of assuming a plane Sv passing through: a apex P1 at which the tapered face 100R, the grounding surface G, and the side face 101 cross each other; a apex P2 at which the tapered face 100R, the grounding surface G, and the side face 103 cross each other; and a apex P3 at which the tapered face 100R, the side face 101, and the side face 103 cross each other, an angle θ11 formed between the plane Sv and the grounding surface G is in the range of 0 degrees<θ11<45 degrees. Alternatively, an angle formed between the plane Sv and the side face 103 is in the range of 0 degrees<θ12<45 degrees. Namely, either the angle θ11 or the angle θ12 may be in the range of 0 degrees<θ11 (or θ12)<45 degrees. Also, further preferably, the angle θ11 (or the angle θ12) is in the range of 10 degrees<θ11 (or θ12)<30 degrees. It is to be noted that in the embodiment, the shape of the tapered face 100R is a planar shape and thus the tapered face 100R and the plane Sv are the same faces.

It is preferable that the tapered face 100R be formed so as to increase a gap L2 in the tire radial direction tr between the apex P1 and the apex P2 more significantly than a gap L1 in the tread widthwise direction tw between the apex P1 and the apex P2. This is due to the following reason. That is, this is because even in the case where the wear of the land block 100 advances from the grounding surface G by increasing the gap L2 more significantly than the gap L1, the tapered face 100R is likely to remain more significantly. Namely, it is possible to improve sustainability of an advantageous effect due to the tapered face 100R. Incidentally, it is further preferable that the gap L2 be 50 mm or more.

Here, as shown in FIG. 10, in the case where the pneumatic tire 1 rotates in the rotational direction R2, the flow (the relative wind) AR of the air of which a direction is opposite to the rotational direction R2 and which takes place due to the rotation of the tire 1 flows along the tapered face 100R. The flow AR of the pneumatic air flowing along the tapered face 100R collides with the side face 104 of the land block 100 arranged on a rear side of the rotational direction R2 and then is guided to the lug groove 40A.

Thus, the flow AR of pneumatic air is formed from the side face 104 to the lug groove 40A of the land block 100.

Namely, the pneumatic air around the tire 1 is taken in the lug groove 40A, and flow rate of the pneumatic air flowing inside of the lug groove 40A can be increased. As a result, the thermal conductivity inside of the lug groove 40A is improved, and the temperature of the tread portion 13 can be reduced.

In the case where the pneumatic tire 1 rotates in the rotational direction R1, the flow (relative wind) AR of the pneumatic air of which a direction is opposite to the rotational direction R1, and which takes place inside of the lug groove 40A due to the rotation of the pneumatic tire 1, flows out along the tapered face 100R. Thus, discharge of the pneumatic air from the lug groove 40A to the outside of the tread widthwise direction tw is prompted, and the flow rate of the pneumatic air flowing inside of the lug groove 40A can be increased. In this manner, the thermal conductivity inside of the lug groove 40A is improved. Further, the temperature of the tread portion 13 can be reduced.

Hereinbefore, the air supply mechanism has been described as to a case in which the buttress protrusion 301 and the tapered face 100R are formed in the pneumatic tire 1. It is to be noted that in the pneumatic tire 1, at least one of the buttress protrusion 301 and the tapered face 100R may be formed, or alternatively, both of them may be formed.

The pneumatic tire 1 according to the embodiment is useful in a tire or the like for mine or the like in which heat generation is likely to cause a problem in particular. In particular, this tire is useful in a tire or the like having a lateral groove 40A (a high angled lateral groove 40A) in which the angle θ1 in an extension direction Ld of the lateral groove 40A is in the range of 15 degrees or more to 60 degrees or less and having the buttress protrusion 301 or tapered face 100R mentioned above. According to the pneumatic tire 1, the air supplied from the buttress portion 14 or the tapered face 100R to the lateral groove 40A increases more significantly and thus the pneumatic air supplied to the circumferential groove 20A by means of the protrusions 200, 201, 202 mentioned above can be further increased. Therefore, an advantageous effect (a cooling effect) of reducing the temperature of the tread portion 13 can be attained more remarkably.

(6) Other Embodiments

As described above, while the contents of the present invention were disclosed through the embodiments of the present invention, it should not be understood that the discussion and drawings forming a part of this disclosure limit the present invention. From this disclosure, a variety of alternative embodiments and examples become self-evident to one skilled in the art. For example, the embodiments of the present invention can be altered as follows.

In the pneumatic tire according to the embodiment, a significant advantageous effect can be attained in the case of a so called ultra-large-scaled tire of 80% or less in flatness, 57" or more in rim diameter, 60 mton or more in loading capacity, and 1.7 or more in load factor (k-factor). For example, as the tire, an ultra-large-scaled pneumatic tire for heavy load, which is employed in mine or the like, is exemplified as one example, and the pneumatic tire according to the embodiment is applied to such a tire, thereby making it possible to attain a more significant advantageous effect. It is to be noted that the pneumatic tire according to the embodiment may be applied to general-purpose tires for vehicles or trucks/buses.

The embodiments presented a tread pattern of the pneumatic tire 1 shown in FIG. 1 as a typical example. However, the pattern is not limited to this tread pattern. For example, the pattern may be of type having a rib-like land portion in which a lateral groove is not formed near the tire equator line of the pneumatic tire 1.

The foregoing embodiments described the fact that lateral grooves (such as a lateral grooves 40A, 40B) are formed at all the same angles with respect to a tire circumferential direction. However, in the same pneumatic tire, the angles of the lateral grooves with respect to the tire circumferential direction may not be always the same. For example, the circumferential land portions 30A, 30B, 30C, 30D may be formed at different angles. Further, in one circumferential land portion 30A also, a lateral groove of a different angle may be formed.

The foregoing embodiments described the fact that lateral grooves (such as lateral grooves 40A, 40B) cross circumferential grooves (20A, 20B). However, all of the lateral grooves may not always cross the circumferential grooves. At least one of the lateral grooves (for example, a lateral groove 40A) may cross a circumferential groove (for example, a circumferential groove 20A).

The embodiments described the fact that protrusions are formed all of land blocks disposed in a tire circumferential direction. However, the land blocks continuously disposed in a tire circumferential direction tc may be formed discretely or multiply discretely.

The shape of protrusion is not limited to a rectangular shape. The shape of protrusion can be altered as described below.

Figure 11:
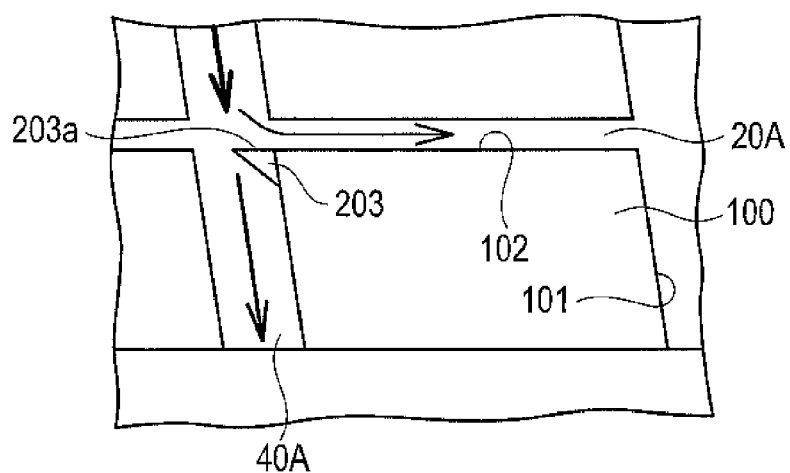
FIG. 11 is a plan view illustrating shape of the protrusion of the pneumatic tire according to the embodiment.

For example, a protrusion 203 shown in FIG. 11 is a triangle in sectional shape vertical to a longitudinal direction of the protrusion 203. Also, in the protrusion 203, a side face 203a on the side of circumferential groove 20A is taken along a side face 102 forming a groove wall of the circumferential groove 20A, and is formed so as to be parallel to an extension direction of the circumferential groove 20A.

Figure 12:
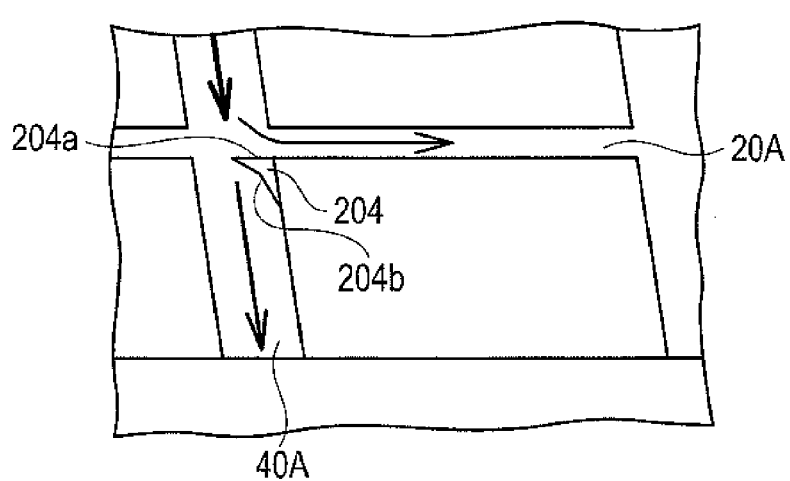
FIG. 12 is a plan view illustrating shape of the protrusion of the pneumatic tire according to the embodiment.

A protrusion 204 shown in FIG. 12 has a side face 204a on the side of the circumferential groove 20A and a side face 204b facing to the outside of the tread widthwise direction tw, and the side face 204b bends.

Figure 13:
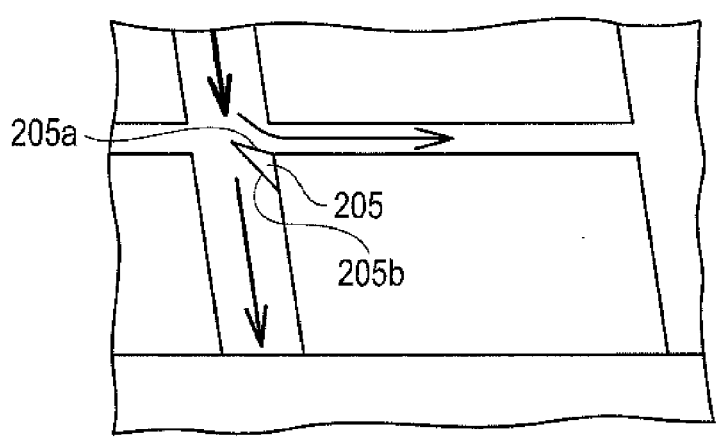
FIG. 13 is a plan view illustrating shape of the protrusion of the pneumatic tire according to the embodiment.

A protrusion 205 shown in FIG. 13 has a shape in which a cross section vertical to a longitudinal direction of the protrusion 205 is inclined toward one side of a rotational direction. Specifically, the sectional shape vertical to the longitudinal direction of the protrusion 205 is a triangle, and a side face 205a on the side of the circumferential groove 20A is inclined toward a groove centerline of the circumferential groove 20A more significantly than a groove wall of the circumferential groove 20A.

Figure 14:
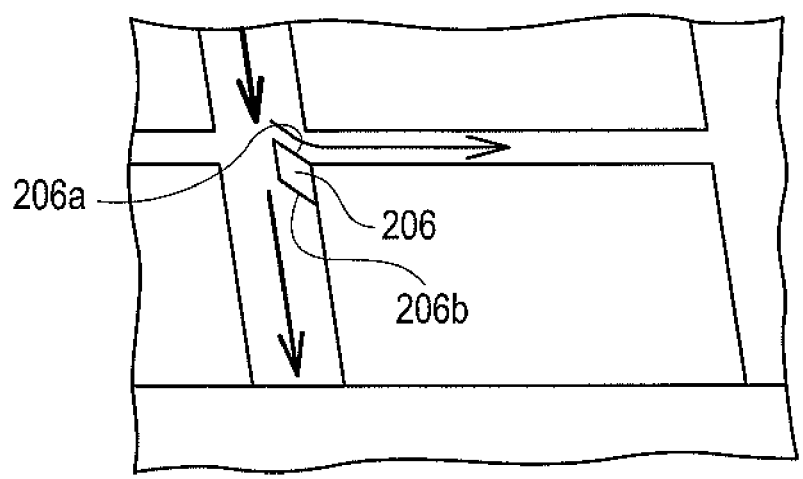
FIG. 14 is a plan view illustrating shape of the protrusion of the pneumatic tire according to the embodiment.

Also, a protrusion 206 shown in FIG. 14 has a quadrangle having inclined faces 206a, 206b which are inclined toward the inside of the circumferential groove 20A in a cross section vertical to a longitudinal direction of the protrusion 206.

Figure 15:
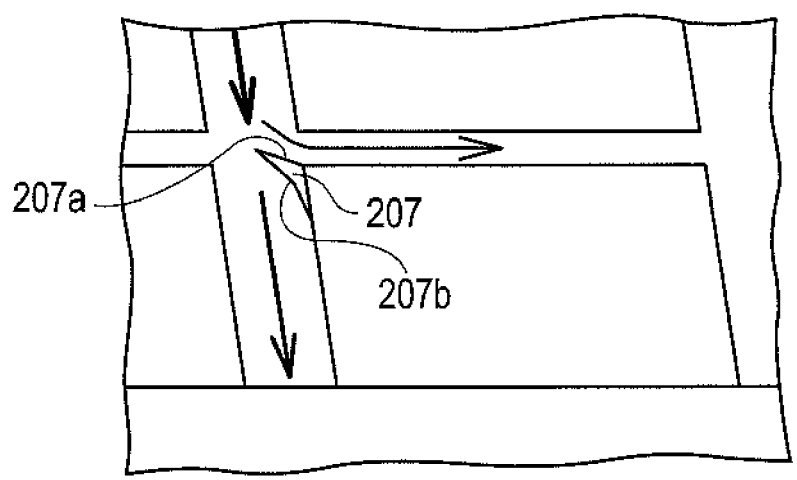
FIG. 15 is a plan view illustrating shape of the protrusion of the pneumatic tire according to the embodiment.

A protrusion 207 shown in FIG. 15 has a side face 207a on the side of the circumferential groove 20A and a side face 207b facing to the outside of the tread widthwise direction tw, and the side face 207a is inclined toward the inside of the circumferential groove 20A. The side face 207b also bends.

A structure other than those of the above examples is applicable as long as the structure is such that pneumatic air flowing inside of the lateral groove 40A can flow into the circumferential groove 20A.

While the embodiments described the fact that the tire is a pneumatic tire to be filled with pneumatic air or gas such as nitrogen gas, the tire may be a so called cushion tire (a solid tire) which is not filled with gas.

Thus, it is a matter of course that the present invention includes various embodiments or the like which are not described herein. Therefore, the technical scope of the present invention is defined only by the specific matters of the invention according to the claims reasonable from the foregoing description.

All the contents of Japanese Patent Application No. 2011-155101 (filed on Jul. 13, 2011) are incorporated in the present specification by reference.

INDUSTRIAL APPLICABILITY

As described hereinbefore, according to the present invention, there can be provided a tire which is capable of reliably improving a heat radiation property without degrading the rigidity or the wear and abrasion resistance of a tread portion and thus the tire is useful in automatic industry or the like.

The invention claimed is:

1. A tire comprising:
   a tread portion having a grounding surface contacting with a road surface;
   a plurality of lateral grooves which are depressed inside of a tire radial direction from the grounding surface, and which are formed along a tread widthwise direction;
   a plurality of circumferential grooves which communicate with the plurality of lateral grooves, which is depressed inside of a tire radial direction from the grounding surface, and which is formed along a tire circumferential direction; and
   a plurality of land blocks which are partitioned by the lateral grooves and the circumferential grooves, wherein
   the plurality of lateral grooves, the plurality of circumferential grooves, and the plurality of land blocks are formed at the tread portion,
   the lateral grooves cross the circumferential grooves in a range of the tread widthwise direction in which the lateral grooves are formed,
   the land block comprising:
      a lateral side face portion forming a groove wall of the lateral grooves; and
      a circumferential side face portion forming a groove wall of the circumferential grooves, wherein
   a protrusion protruding in the tire circumferential direction from the lateral side face portion and extending in a tire radial direction is formed in a region of one side of the tread widthwise direction of the land blocks more significantly than a central part of the lateral side face portion,
   the tire further comprising:
      a bead portion, a side wall portion communicating with the bead portion, the tread portion contacting with the road surface, and a buttress portion extending from a tread end part located outside of the widthwise direction of the tread portion toward inside of the tire radial direction leading up to a groove bottom of the lateral grooves, wherein
   a buttress protrusion protruding in the tread widthwise direction and supplying pneumatic air to the lateral grooves is provided on the buttress portion.

2. The tire according to claim 1, wherein
   a length in the tire radial direction of the protrusion is smaller than a length from the grounding surface leading up to a bottom portion of the lateral grooves, and an end part in the tire radial direction of the protrusion is located so as to be inner in the tire radial direction than the grounding surface.

3. The tire according to claim 1, wherein
the protrusion is formed in a rectangular shape having the tire radial direction as a longitudinal direction, and
a length from an end part of the tread widthwise direction in the block side face portion leading up to an end part of the protrusion in the tread widthwise direction is p, a length in the tire circumferential direction of the protrusion is Lts, and a relationship of p <2 Lts is met.

4. The tire according to claim 1, wherein
a length in the tire circumferential direction of the protrusion is Lts, a width in the tire circumferential direction of the lateral grooves is Lls, and a relationship of Lts <0.5Lls is met.

5. The tire according to claim 1, wherein the lateral side face portion is inclined with respect to a tread widthwise directional line along the tread widthwise direction, and
the protrusion is formed at the lateral side face portion in which an angle formed between the lateral side face portion and the circumferential side face portion is an acute angle.

6. The tire according to claim 1, wherein
the protrusion is formed only in the land block formed at an inner portion in the tread widthwise direction relative to a cross portion at which the lateral grooves cross the circumferential groove.

7. A tire comprising:
a tread portion having a grounding surface contacting with a road surface;
a plurality of lateral grooves which are depressed inside of a tire radial direction from the grounding surface, and which are formed along a tread widthwise direction;
a plurality of circumferential grooves which communicate with the plurality of lateral grooves, which is depressed inside of a tire radial direction from the grounding surface, and which is formed along a tire circumferential direction; and
a plurality of land blocks which are partitioned by the lateral grooves and the circumferential grooves, wherein
the plurality of lateral grooves, the plurality of circumferential grooves, and the plurality of land blocks are formed at the tread portion,
the lateral grooves cross the circumferential grooves in a range of the tread widthwise direction in which the lateral grooves are formed,
the land block comprising:
a lateral side face portion forming a groove wall of the lateral grooves; and
a circumferential side face portion forming a groove wall of the circumferential grooves, wherein
a protrusion protruding in the tire circumferential direction from the lateral side face portion and extending in a tire radial direction is formed in a region of one side of the tread widthwise direction of the land blocks more significantly than a central part of the lateral side face portion,
the tire further comprising:
a bead portion, a side wall portion communicating with the bead portion, the tread portion contacting with the road surface, and a buttress portion extending from a tread end part located outside of the widthwise direction of the tread portion toward inside of the tire radial direction leading up to a groove bottom of the lateral grooves, wherein
a tapered face intersecting with the grounding surface, a side face on the tread end part, and the lateral side face portion, of the land block, and supplying pneumatic air to the lateral grooves, is provided on the tread end part.

* * * * *